United States Patent [19]
Nelson

[11] 3,877,034
[45] Apr. 8, 1975

[54] ARTIFICIAL DIELECTRIC STRUCTURE AND ITS METHOD OF FABRICATION

[75] Inventor: Paul T. Nelson, Los Angeles, Calif.

[73] Assignee: TRW Inc., Redondo Beach, Calif.

[22] Filed: Dec. 6, 1973

[21] Appl. No.: 422,234

[52] U.S. Cl............................. 343/872; 343/911 R
[51] Int. Cl. ............................................ H01q 15/10
[58] Field of Search......... 343/756, 909, 872, 911 R

[56] References Cited
UNITED STATES PATENTS
2,763,860  8/1956  Ortusi et al. ....................... 343/909
3,205,499  9/1965  Raburn .............................. 343/784

OTHER PUBLICATIONS
Kock, Bell Telephone System Monograph B–1519, pp. 8–12, 1948.

*Primary Examiner*—Eli Lieberman
*Attorney, Agent, or Firm*—Daniel T. Anderson; Donald R. Nyhagen; Jerry A. Dinardo

[57] ABSTRACT

A dimensionally stable artificial dielectric phase changing structure, such as a dielectric lens, for use in a thermal environment whose temperature varies over a temperature range. The structure is composed of a stack of artificial dielectric units each having an elastic dielectric membrane perimetrically joined to a supporting ring and provided with electromagnetic obstacle means aligned in a selected three dimensional matrix array to form an artificial dielectric medium. The membranes are prestressed to have an initial tension at a selected reference temperature such that the membranes will remain taut without plastic deformation to effect retention of the obstacle means on the several membranes in precise alignment over the entire environmental temperature range.

17 Claims, 9 Drawing Figures

ASSEMBLY

PATENTED APR 8 1975 3,877,034

FORM RING AND MEMBRANE BLANK

TRIM

FORM DOT PATTERN

BOND RING AND BLANK
(MEMBRANE PRESTRESS)

DRILL

ASSEMBLY

ARTIFICIAL DIELECTRIC STRUCTURE AND ITS METHOD OF FABRICATION

BACKGROUND OF THE INVENTION

1. Field of the Invention

This invention relates generally to dielectric structures for changing the phase velocity of electromagnetic waves and more particularly to an improved, dimensionally stable artificial dielectric phase velocity changing structure and to a method of making the structure.

2. Prior Art

Dielectric, both solid dielectrics and so-called artificial dielectrics, are used to change the phase velocity of electromagnetic waves. Such dielectrics can be utilized for a variety of specific functions. For example, a dielectric structure can be designed to focus incoming electromagnetic radiation from a remote source or to collimate into a beam radiation from a near source. When used in this manner, the dielectric structure functions essentially as an electromagnetic lens and, for this reason, is referred to variously as a dielectric lens, a delay lens, or lens antenna. This invention is concerned primarily with this particular lens application and will be described in such context. However, it will become readily apparent as the description proceeds that the invention may be utilized in dielectric phase velocity changing structures for other purposes.

As in the field of optics, the basic techniques for focusing and collimating electromagnetic waves involve changing the ray directions of the waves by either reflection or refraction. Virtually all present day beam antennas, such as parabolic dish antennas, employ the reflection technique in spite of the fact that such reflection type antennas have numerous inherent disadvantages. The foremost of these are relatively large size, weight, and cost, and location of the antenna feed in front of the reflection in the path of the incident or emitted radiation.

The ability of dielectrics to change the ray direction of electromagnetic waves by refraction rather than reflection, and hence the ability of dielectrics to serve as antennas, has been recognized for almost a century. Such dielectric antennas or antenna lenses have one distinct advantage over relection type antennas. This advantages resides in the fact that the antenna feed is located behind rather than in front of the antenna and hence out of the beam path.

Up until about 1942 to 1944, however, the only dielectrics which were known for this use were solid dielectrics. An antenna lens constructed of such a solid dielectric is relatively large, heavy and costly, and as a consequence, solid dielectric lenses have been used only to a limited extent and primarily for experimental purposes.

In the period from 1942 through 1944, a new class of dielectric was suggested by Rust and Kock. These new dielectrics, known as artificial dielectrics, are relatively lightweight and can be constructed into antenna lenses at relatively low cost, thus avoiding the disadvantages of solid dielectrics. Here again, however, in spite of these advantages of artificial dielectrics, the latter, like solid dielectrics, have been used only to a very limited extent for antenna lenses. A major reason for this limited usage of the existing artificial dielectrics in antenna lenses is their thermally induced dimensional instability under varying environmental conditions.

In order to understand this dimensional instability and its effect on the usefulness of artificial dielectrics for antenna lense, it is well to consider the artificial dielectrics which have been proposed to date. The prior art is replete with a vast assortment of artificial dielectric structures. Among the prior art disclosures of artificial dielectric lenses, for example, are the Kock U.S. Pat. Nos. 2,577,619 and 2,579,324. Artificial dielectric lenses and other artificial dielectric structures are also described in the following publications:

Bell Systems Technical Journal, 1948, Vol. 27, pages 58–82

Antenna Engineering Handbood, First Ed., 1961, McGraw Hill, pages 14–21 through 14–30

As will be evident from the above prior art, artificial dielectric lenses may vary widely in their detailed physical construction. However, such artificial dielectric lenses are characterized by the common feature of a multiplicity of electromagnetic obstacles supported in parallel planes by dielectric means of low dielectric constant to provide a three dimensional obstacle array. This obstacle array, together with its dielectric supporting means, constitutes an artificial dielectric medium through which electromagnetic waves propagate with a phase velocity less than their phase velocity in air.

The thermally induced instability referred to above, from which the prior art artificial lenses suffer to one degree or another, degrades lens performance for the reason that proper operation of such a lens requires precise alignment of the obstacles in its several obstacle planes. The artificial dielectric lenses of the prior art are not designed to maintain such precise obstacle alignment in a thermal environment whose temperature varies over any substantial range and hence are limited to use in essentially constant temperature environments, or at least thermal environments which experience a relatively small temperature change.

In this regard, consider, for example, the lens shown on page 68 of the above referenced Bell Systems Journal. In this lens, the electromagnetic obstacles are electrically conductive dots on thin dielectric sheets or membranes constructed of cellophane. These sheets are arranged or stacked in parallel side by side fashion with annular frames positioned between and spacing the adjacent membranes. The frame openings provide apertures across which the membranes extend. The conductive dots on the membranes are arranged in a three dimensional lens-like matrix array which collimates into a beam electromagnetic radiation emanating from an antenna horn situated behind the lens and focuses at the horn incoming radiation from a distant source.

The lens frames and obstacle supporting membranes are assembled in such a way that the obstacles are properly aligned at normal room temperature. Accordingly, the artifical dielectric lens described in the Journal is at least theoretically capable of satisfactory operation so long as the ambient temperature remains substantially at normal room temperature.

On the other hand, if the ambient temperature increases substantially above normal room temperature, the membranes will deform due to thermal expansion and the conductive dots or obstacles on the membranes will undergo relative movement out of alignment, thus degrading the operation of the lens or rendering it totally inoperable. Conversely, if the ambient temperature drops substantially below normal room temperature, the tension in the membranes may increase, dut to thermal contraction, sufficiently to cause deformation of the membranes. This deformation, if it occurs, will cause misalignment of the obstacles and hence malfunctioning of the lens. The other artificial dielectric constructions disclosed in the earlier listed prior art are similarly sensitive to changing temperature and thus are unsuited to use in all but essentially constant temperature environment. It is for this reason that the prior art artificial dielectric lenses and other structures have been used only to a very limited extent.

SUMMARY OF THE INVENTION

This invention provided an improved dimensionally stable artificial dielectric phase changing structure and method of its fabrication which avoid the above stated and other disadvantages of the existing structures of this kind. As noted earlier,, the invention will be described in connection with an artificial dielectric lens atenna or lens, but may be applied to other types of artificial dielectric structures.

The artificial dielectric structure of the invention has a stack of artificial dielectric elements or units, each comprising a dielectric membrane and a relatively rigid supporting frame or ring secured to the membrane about its perimeter. The several units are stacked side by side with their rings in coaxial alignment and are firmly clamped together to form a unitary structure by tension botls passing through the rings or in some other appropriate fashion.

Each membrane is provided with electromagnetic obstacle means forming with the membrane an artificial dielectric medium. In the described lens embodiment of the invention, the obstacle means on each membrane comprise a multiplicity of discrete electromagnetic obstacles arrayed in a prescribed pattern or three-dimensional matrix array. These obstacles may comprise any of the known types of obstacles, including both conductive and dielectric obstacles, although the preferred and described obstacles are metallic dots which are sprayed, silk-screened, vacuum deposited and etched, laminated, or otherwise applied to the membranes. In a second described embodiment of the invention, the obstacle means of each membrane comprises a metallic coating on one membrane surface having an array of openings through the coating.

The invention is concerned primarily with rendering the artificial dielectric structure dimensionally stable, that is immune to relative displacement of its obstacle means from their initial alignment in response to the changing temperature of the thermal environment in which the structure is to be used. According to the invention, this is accomplished by prestressing the membranes of the structure to an initial tension within their supporting rings or frames at a selected reference temperature, such as room temperature, such that the membranes will remain taut over the entire environmental temperature range without exceeding the maximum permissible stress which the membranes will sustain without degrading the operation of the structure over a specific operating lifetime. In other words, the membranes are prestressed to an initial tension at the specified reference temperature, such that at one extreme temperature (minimum stress temperature) of the environmental temperature range, the membranes will possess a finite minimum tension sufficient to maintain the membranes taut, and at the other extreme temperature (maximum stress temperature) of the temperature range, the membrane tension will be equal to or less than the maximum permissible membrane tension. While the tension in the membranes, when thus prestressed will vary in response to the changing temperature of the thermal environment, the changing tension will produce no displacement of the electromagnetic obstacles on the membranes. Accordingly, these obstacles will remain in precise alignment for the entire prescribed operating lieftime of the artificial dielectric structure.

In this disclosure, the expression "maximum permissible stress" is used to denote the maximum stress which the membranes will withstand without resulting in any degrading of the operation of the artificial dielectric structure over its prescribed operating lifetime. More specifically, the above expression, in the context of the disclosure, means the maximum stress which the membranes will sustain without creep or plastic deformation of the extent necessary to produce sufficient misalignment of the electromagnetic obstacles to degrade the operation of the artificial dielectric structure to an unsatisfactory operating level over the prescribed operating lifetime of the structure.

It is significant to note here that the invention contemplates within its scope artificial dielectric structures having three different modes of thermal response, determined by the coefficients of thermal expansion ($\alpha$) of their membranes and membrane supporting rings. These modes are referred to as direct, inverse and constant tension modes, respectively. An inverse mode structure is one whose membrane coefficient ($\alpha_M$) exceeds the ring coefficient ($\alpha_R$), i.e., $\alpha_M > \alpha_R$. In this structure, the membrane tension varies inversely with temperature; that is the membrane tension increases with decreasing temperature and decreases with increasing temperature. A direct mode structure is one whose ring coefficient exceeds the membrane coefficient, i.e., $\alpha_R > \alpha_M$. In this structure, the membrane tension varies directly with temperature; that is, the membrane tension increases with increasing temperature and decreases with decreasing temperature. A constant tension mode structure is one whose membrane and ring coefficients are substantially equal, i.e., $\alpha_M \approx \alpha_R$. In this structure, the membrane tension remains essentially constant as the temperature changes.

It is apparent that the extreme membrane tensions of inverse and direct mode artificial dielectric structures occur at opposite extreme temperatures of the thermal environment in which the structures are to be used. That is to say, the minimum and maximum tensions in an inverse mode structure occur at the high and low extreme temperatures, respectively, and in a direct mode structure at the low and high temperatures, respectively. For this reason, the expressions "minimum stress temperature" and "maximum stress temperature" are used herein to identify the extreme temperatures of the environment with reference to the inverse and direct mode structures.

Prestressing of the membranes of the artificial dielectric structures may be accomplished in various ways. According to the preferred practice of the invention, prestressing of the membranes of direct and inverse mode structures is accomplished by securing the membranes to their supporting rings while the rings and membranes are retained at a temperature, referred to herein as the assmebly temperature, which is higher than the highest temperature of the temperature range of the thermal environment in which the artificial dielectric structure is to be used, in the case of an inverse mode structure ($\alpha_M > \alpha_R$) or lower than the lowest temperature of the range in the case of a direct mode structure ($\alpha_M < \alpha_R$). Under these conditions, cooling of the inverse mode structure and heating of the direct mode structure from their assembly temperatures to the temperature range of the thermal environment will create in the membranes a tension which will possess a finite value greater than zero tension at the minimum stress temperature of the range and will increase as the temperature changes toward the maximum stress temperature of the range. The assembly temperature is selected to provide a maximum membrane tension at the maximum stress temperature of the environmental temperature range less than the maximum permissible stress of the membranes. This thermal prestressing method cannot be used to prestress the membranes of a constant tension mode structure. According to an alternate prestressing procedure, which may be used for structures of all three modes, the membranes are maintained under the proper prestress tension by mechanical means while they are being secured to their supporting rings.

It will be understood the proper prestressing of the membranes of inverse mode and direct mode artificial dielectric structures requires consideration of two factors, namely, the change in tension of the membranes occasioned by thermal expansion and contraction of the membranes per se over the environmental temperature range and the tension change occasioned by thermal expansion and contraction of the rings over this temperature range. In this regard, it is important to mention that the invention contemplates within its scope inverse mode dielectric structures whose membrane supporting rings have either a finite coefficient of thermal expansion or a zero coefficient. If the rings have a finite coefficient, it must be taken into account when determining the proper membrane prestress. On the other hand, if the rings have a zero or near zero coefficient, only the membrane coefficient need be considered when determining the membrane prestress.

The preferred form of the invention is an inverse mode artificial dielectric structure whose membrane supporting rings have an essentially zero coefficient of thermal expansion. The preferred membrane prestressing procedure is the thermal method.

DESCRIPTION OF THE PREFERRED EMBODIMENTS

Figure 1:
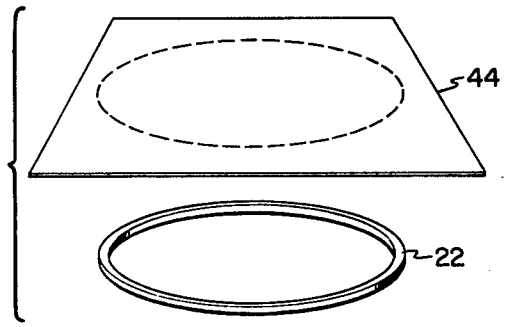
FIGS. 1 through 6 illustrate successive steps in fabricating an artificial dielectric structure according to the invention.
Figure 3:
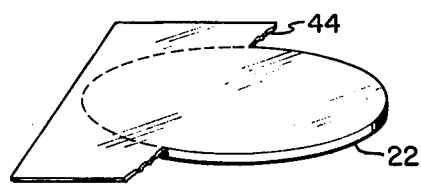

The artificial dielectric phase velocity changing structure 10 of the invention shown in FIGS. 1 through 7, is an artificial dielectric antenna lens for collimating into a beam electromagnetic radiation from an antenna feed 14 and for focussing incoming radiation at the feed. Lens 10 is composed of a plurality of artificial dielectric units 16 arranged side by side in coaxial stacked relation and firmly and joined into an integral lens structure by tension bolts 18.

The lens units 16 are similar and each comprises an elastic dielectric membrane 20 and a relatively rigid supporting frame or ring 22 adhesively bonded or otherwise secured to the membrane about its perimeter. The several membranes supporting rings 22 have the same diameter and are coaxially disposed side by side with the adjacent rings in contact. The tension botls 18 extend through the rings and clamp the rings firmly together to form a rigid unitary lens structure.

Figure 7:
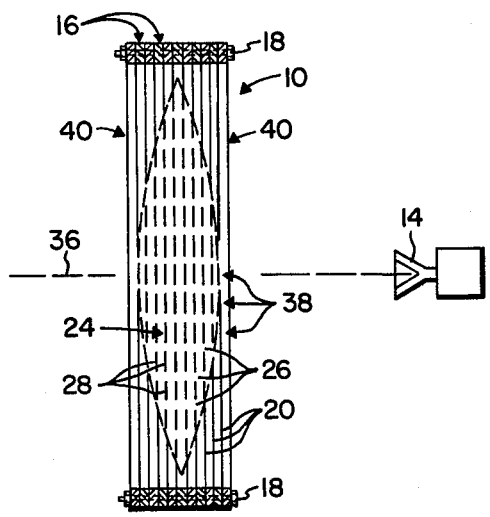
FIG. 7 illustrates the completed structure.

Each membrane 20 has electromagnetic obstacle means 24 and dielectric regions 26 arrayed in a predetermined pattern to form an artificial dielectric medium. The obstacle means and dielectric regions of the several dielectric media are arranged to form an artificial dielectric structure for refracting electromagnetic waves passing through the structure. In the particular lens structure shown, the membranes 20 are preferably constructed of a suitable plastic film, such as Mylar or Kapton. The electromagnetic obstacle means 24 of each membrane comprise metallic dots 28 which may have any suitable shape (i.e., round, square, etc.) and may be applied to the membranes in any convenient way. According to the preferred practice of the invention, the dots 28 are applied to the membranes by either a vacuum deposition — photo etch process or a silk screen printing process. The dielectric regions 26 of the membranes comprise the exposed portions of the membranes between their dots 28. The dots of the several membranes are arranged in a three-dimensional matrix array 30 of generally lens profile in edge view, as shown in FIG. 7.

The precise arrangement and spacing of the dots 28 in the three-dimensional lens matrix array 30 is determined by the desired electromagnetic properties of the dielectric structure, as discussed in the prior art referred to earlier and thus need not be elaborated on in this disclosure. Suffice it to say that in the particular antenna lens shown, the dots on each membrane 20 are arranged in a series of concentric circles centered on the common axis 36 of the membrane supporting rings 22. The dots on the several membranes are aligned in columns 38 parallel to the axis. As shown best in FIG. 7, the lengths of the columns 38 vary progressively from the axis 36 outwardly toward the perimeter of the array 30 to provide the latter with the generally lens-shaped profile shown.

Proper operation of the artificial dielectric lens 10 requires precise alignment of the dot patterns in the several columns 38. As noted earlier, this alignment requirement has presented a serious problem in the past in artificial dielectric lenses intended for operation in a thermal environment whose temperature varied over a relatively wide range. Thus, in such a variable thermal environment, the obstacle supporting means or membranes of prior lenses would experience slack and/or plastic or elastic deformation resulting in misalignment of the obstacle in the array.

The present invention proposes to overcome this disadvantage of the existing artificial dielectric lenses by prestressing the individual membranes 20 of the lens 10 to an initial tension at a selected reference temperature such that exposure of the lens to the temperature range of the thermal environment in which the lens is to operate causes the tension of the membranes to vary between a maximum tension less than the maximum permissible stress of the membranes and a finite minimum tension. Accordingly, the membranes will remain taut without plastic deformation over the entire temperature range of the thermal environment. While the tension in the membranes will vary with the temperature, no edgewise displacement will occur at any given points of teh membranes. The metallic obstacles or dots on the membranes will thus remain in precise alignment, and hence the artificial dielectric structure or lens 10 will remain operative, over the entire temperature range of the thermal environment. In other words, the structure will possess high thermal stability.

Proper prestressing of the membranes 20 to attain such thermal stability requires consideration of the creep characteristics of the membranes and the thermal expansion coefficients of both the membranes and their supporting rings 22. That is to say, any measurable creep which may occur in the membranes under tension must be compensated for by increasing the initial tension of the membranes, above the tension value which would be required in the absence of such creep, sufficiently to assure that the membranes will remain appropriately taut at the minimum stress temperature of the thermal environment after maximum creep of the membranes has occurred. Also, the tension changes which occur in the membranes both as a result of thermal expansion and contraction of the membranes themselves, and as a result of thermal expansion and contraction of the membrane supporting rings, must be taken into account in prestressing the membranes to assure the proper range of membrane tension in the thermal environment.

In this latter regard, it will be recalled from the earlier discussion that the invention contemplates within its scope artificial dielectric structures having three different modes of thermal response, namely an inverse mode wherein $\alpha_M > \alpha_R$ and the membrane tension varies inversely with temperature, a direct mode wherein $\alpha_R > \alpha_M$ and the membrane tension varies directly with temperature, and a constant tension mode wherein $\alpha_R \approx \alpha_M$ and the membrane tension remains substantially constant as the temperature changes. Moreover, an inverse mode structure or lens may have membrane support rings with either a finite coefficient of thermal expansion of an essentially zero coefficient. In the case of a finite ring coefficient, the latter must be considered in determining the proper membrane prestress as stated above. In the case of a zero ring coefficient, only the membrane coefficient need be considered in determining the membrane prestress. The manner in which the membranes are prestressed will be explained presently.

It may be desirable to thermally insulate the active artificial dielectric membranes 20 from the thermal environment in which the lens 10 is used in order to minimize the effect of the environmental temperature changes on the membranes. To this end, the illustrated artificial dielectric lens 10 is provided with dummy dielectric units 40 at opposite ends of the stack of artificial dielectric lens units 16 which function as thermal insulators. These dummy insulator units are identical to the units 16 except that the membranes 42 of the insulator units are devoid of any obstacles or conductive dots.

Reference is now made to FIGS. 1 through 6 illustrating one method of fabricating the artificial dielectric lens 10. The first step of the illustrated fabrication method involves forming the membrane support rings 22 and an equal number of membrane blanks 44 (FIG. 1) somewhat larger than the rings.

In the next step (FIG. 2) of the fabrication method, the membrane blanks 44 are bonded to the rings 22 in such a way that the membranes 20 of the finished lens will be prestressed to the proper initial tension at a selected reference temperature, such as room temperature, to maintain the membranes taut without exceeding their maximum permissible stress for a specified operating lifetime and over the entire temperature range of the thermal environment in which the lens is to operate, as explained earlier. This prestressing of the membranes may be accomplished in various ways.

For example, the membrane blanks 44 may be stretched mechanically at room temperature to the proper initial tension while they are being bonded to their rings 22. This mechanical prestressing method may be utilized for all three types of the present artificial dielectric structures or lenses, i.e., inverse mode, direct mode, and constant tension mode. Proper mechanical prestressing of the membranes of a constant tension mode structure obviously involves merely placing the membranes under sufficient tension to make them properly taut for the purposes of a dielectric lens and then bonding or otherwise securing the tensioned membranes to their supporting rings in such a way that the membranes retain their prestress tension. The membranes will retain this tension over the temperature range of the thermal environment since, as noted earlier, in such a constant tension mode lens the membrane tension remains constant over the range. In the case of inverse and direct mode lenses, the membrane prestress tension must be determined in the manner explained below.

According to the preferred practice of the invention, the initial or prestress tension is established in the membranes of inverse and direct mode artificial dielectric structures by bonding the membrane blanks to the rings while they are free of both slack and stress and heated to an elevated temperature (assembly temperature) higher than the highest temperature of the thermal environment in which the lens is to operate in the case of an inverse mode structure or cooled to a temperature less than lowest temperature of the environment in the case of a direct mode structure. Subsequent cooling of the bonded inverse mode membranes and rings or heating of the direct mode membranes and rings from their assembly temperature to a given temperature (referred to herein as a reference temperature) within the temperature range of the thermal environment will create in the membranes a stress (referred to herein as an initial stress or prestress) which is a function of the difference between the assembly and reference temperatures, the thermal coefficients of the membranes and rings, and certain other factors, as explained below. The stress in the membrane will vary from this initial stress and between minimum and maximum stress levels in response to variation of temperature between the extreme temperatures of the thermal environment.

It will now be understood that the minimum and maximum stresses occurring in the membranes 20 when exposed to the thermal environment in which the artificial dielectric structure or lens 10 is to operate are determined by the assembly temperature at which the membranes are joined to their rings 22. According to the invention, this assembly temperature is selected to provide the membranes with a finite minimum stress at the minimum stress temperature of the environment sufficient to maintain the membranes taut enough to assure satisfactory operation of the lens. The assembly temperature is also selected to provide the membranes with a maximum stress equal to or less than their maximum permissible stress at the maximum stress temperature of the environment.

In connection with this assembly temperature selection, it can be demonstrated that the thermal response of each artificial dielectric lens unit 16 is expressed by the following equation:

$$S = \left| \frac{E}{1-\mu}(T_R - T_A)(\alpha_M - \alpha_R) \right|$$

where
$T_A$ = assembly temperature
$T_R$ = reference temperature
$S$ = stress in membrane at reference temperature $T_R$ (assuming membrane and ring are joined with no slack or stress in membrane)
$E$ = Young's Modulus of membrane
$\mu$ = Poisson's Ratio of membrane
$\alpha_M$ = thermal coefficient of membrane
$\alpha_R$ = thermal coefficient of ring It is readily apparent that the above equation permits a determination of the assembly temperature necessary to achieve preselected minimum and maximum stresses or tensions in the membranes 20 of the dielectric lens 10 when the latter is exposed to the temperature range of the thermal environment. Thus, for dielectric lens units 16 of given dimensions and membrane and ring materials, and a thermal environment with given minimum and maximum temperatures, the membrane stress existing at these extreme temperatures for a given assembly temperature or the assembly temperature necessary to produce given minimum and maximum stresses in the membranes may be easily determined from the equation. Thus, the proper assembly temperature to produce the desired finite minimum stress in the membranes at the minimum stress temperature of the thermal environment and the desired maximum membrane stress, less than or equal to the maximum membrane stress, may be easily determined from the equation.

It is significant to note that the equation may be used to determined the assembly temperature for both direct and indirect mode artificial dielectric structures or lenses. For constant mode structures where $\alpha_M = \alpha_R$, it will be seen that the equation yields a zero stress valuue. This simply means, of course, that the temperature change produces no stress change in the membranes and that the stress existing in the membranes will remain constant, over the entire environmental temperature range, at the level to which the membranes are mechanically stressed during assembly.

The equation may also be utilized to determine the proper membrane stress when mechanically stressing the membranes of direct or indirect mode artificial dielectric structures. In this case, however, the mechanically produced prestress in the membranes must be added to stress values S obtained from the equation to obtain the total membrane stress in the thermal environment.

When prestressing the membranes 20 in the manner explained above, any creep which may occur in the membranes after joining of the membrane blanks 44 to their rings 22 must be compensated for by adjusting the assembly temperature obtained from the earlier equation, or adjusting the mechanically produced prestress, to increase the initial membrane stress by an amount equal to the decrease in stress resulting from creep.

It is obvious that the equation takes into account changes in membrane tension resulting from both expansion and contraction of the membranes themselves and expansion and contraction of the membranes themselves and expansion and contraction of the membrane supporting rings. According to the preferred practice of the invention, this latter effect of the rings on the membrane tension is alleviated or eliminated by utilizing rings having a relatively low and preferably a virtually zero coefficient of thermal expansion. Such zero coefficient rings may be fabricated by impregnating with epoxy resin ring-shaped laminae of graphite fiber material having a generally circumferential fiber orientation. The several layers of each ring may be cross-plied, that is arranged with their fiber directions at an angle relative to one another, according to a fiber orientation which is optimal on the basis of strength and expansivity. Since the fibers by themselves have a negative coefficient of longidutinal thermal expansion, the degree of expansibility can be controlled to near zero by fiber orientation and relative volume of the epoxy resin matrix. Alternatively, the membrane support rings 22 may be molded from a material, such as the material marketed by DuPont Co. under the trade name PRD-49, having a suitably low thermal coefficient, or low expansion metal such as Invar, marketed by Carpenter Steel Co.

After bonding of the rings 22 and membrane blanks 44 under conditions which effect prestressing of the membranes 20, as described, the blanks are trimmed off flush with the outer edges of the rings (FIG. 3), and the rings are drilled (FIG. 4) to provide clearance holes 46 for the tension bolts 18 of the lens and tooling holes 47.

Figure 5:
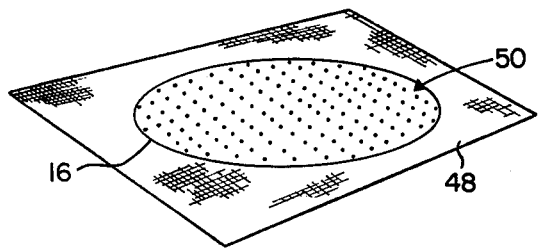

The steps described thus far complete the fabrication of the lens units 16 except for application of the conductive obstacles or dots 28 in the appropriate patterns to their membranes 20. These obstacles or dots may be applied to the membranes in any convenient way, such as by the silk screen process illustrated in FIG. 5. In FIG. 5, a printing screen 48 with an appropriate hole pattern 50 is prepared for each membrane. The screen is then aligned with its membrane with the aid of the tooling holes 47 and firmly held in face to face contact with the membrane and a metallic coating, suitable for silk screen printing, is applied over the screen. This coating penetrates the holes in the screen to form the metallic dots on the membrane. The metallic dots will be applied to the membranes and dimensionally coordinated with the tooling holes in a manner such that when the several lens units 16 are finally assembled in stacked relation with the units aligned by locating pins extending through the tooling holes 47 and joined by the tension bolts 18 to form the completed lens 10 of FIG. 6, the dots on the several membranes will be aligned in the columns 38 to form the desired three-dimensional lens-like matrix array. The thermal insulator units 40, if used, will be assembled with the dielectric units 16.

Figure 8:
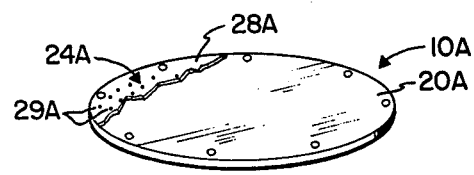
FIG. 8 illustrates one unit of a modified dielectric structure according to the invention.
Figure 9:
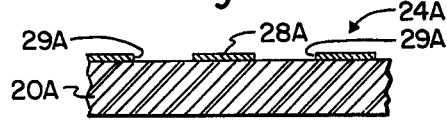
FIG. 9 is an enlarged section through the artificial dielectric medium of FIG. 8.
Figure 2:
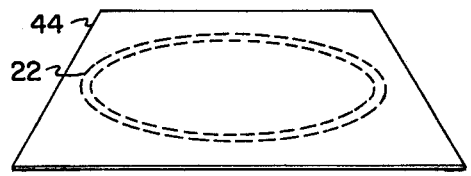
Figure 4:
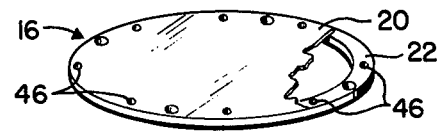
Figure 6:
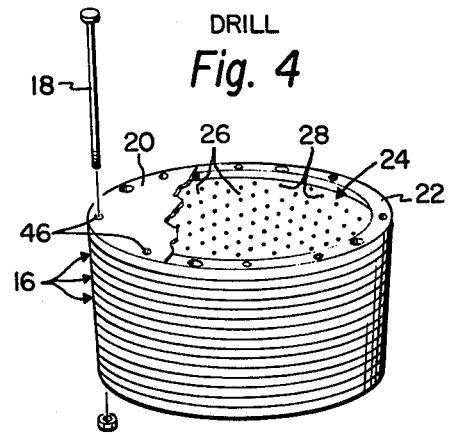

The artificial dielectric lens described above is a phase delay dielectric. The artificial dielectric phase velocity changing structure 10A illustrated in FIGS. 8 and 9 is also a phase advance dielectric. This latter structure is identical to and is fabricated in the same manner as the lens 10 except that the obstacle means 24A of each membrane 20A comprises a metallic coating or layer 28A on one surface of the membrane having a pattern of holes 29A through the layer. This type of artificial dielectric structure is termed a phase-advance dielectric since it has a refractive index less than unity as compared to the delay dielectric which has a refractive index greater than unity. The operation of both types of structures is explained in the earlier cited prior art and hence need not be elaborated on in this disclosure.

It will be immediately evident to those versed in the art that artificial dielectric phase velocity changing structures according to the invention may be designed for purposes other than those described to this point. For example, such structures may be designed, by arrangement of their membrane obstacles in the appropriate three-dimensional matrix array, to function as frequency selective media, prism, and focusing devices.

I claim:

1. A dimensionally stable artificial dielectric unit to be assembled with other similar units to form one artificial dielectric phase changing structure for use in a thermal environment whose temperature fluctuates over a given temperature range, comprising:
   a relatively rigid circular ring having a central aperature, a dielectric membrane extending across said ring aperature and secured to said ring about the circumference of said ring;
   electromagnetic obstacle means on said membrane and forming with the membrane an artificial dielectric medium; and
   said membrane being prestressed to an initial tension at a selected reference temperature such that exposure of said unit to said temperature range causes the stress in said membrane to vary between a finite minimum stress value greater than zero at the minimum stress temperature of said range and a maximum stress value equal to or less than the maximum permissible stress of the membrane at the maximum stress temperature of said range, whereby said membrane remains taut and said obstacle means remain in fixed position relative to said ring over the entire temperature range.

2. An artificial dielectric unit according to claim 1 wherein:
   said membrane comprises a dielectric film and said obstacle means comprises an array of discrete electromagnetic obstacles on said membrane.

3. An artificial dielectric unit according to claim 1 wherein:
   said membrane comprises a dielectric film substrate and said obstacle means comprises a metallic coating on one surface of said membrane hzving an array of holes through said coating.

4. An artificial dielectric unit according to claim 1 wherein:
   said membrane and ring have substantially equal coefficients of thermal expansion.

5. An artificial dielectric unit according to claim 1 wherein:
   said membrane and ring have different coefficients of thermal expansion.

6. An artificial dielectric unit according to claim 1 wherein:
   said ring coefficient approximates zero.

7. A dimensionally stable artificial dielectric phase changing structure for use in a thermal environment whose temperature fluctuates over a given temperature range comprising:
   a stack of artificial dielectric units each comprising a relatively rigid circular ring having a central aperture, a dielectric membrane extending across said ring aperature and secured to said ring about the circumference of said ring, electromagnetic obstacle means on said membrane and forming with the membrane an artificial dielectric medium, and said membrane being prestressed to an initial tension at a selected reference temperature such that exposure of said structure to sasid temperature range causes the stress in said membrane to vary between a finite minimum stress value greater than zero at the minimum stress temperature of said range and a maximum stress value equal to or less than the maximum permissible stress of the membrane at the maximum stress temperature of said range, whereby said membrane remains taut and said obstacle means remain in fixed position relative to said ring over the entire temperature range;
   said units being disposed side by side in coaxial stacked relation with the membranes of the adjacent units spaced by the rings; and
   means joining said rings to form a unitary structure wherein the obstacle means on the several membranes remain in fixed relation to one another over the entire temperature range.

8. An artificial dielectric structure according to claim 7 wherein;
   each membrane comprises a dielectric film substrate and said obstacle means comprises an array of discrete electromagnetic obstacles on each membrane.

9. An artificial dielectric structure according to claim 7 wherein:
   each membrane comprises a dielectric film substrate and said obstacle means comprises a metallic coating on one surface of each membrane having an array of holes through said coating.

10. An artificial dielectric structure according to claim 7 wherein:
    thermal insulator units at the ends of said stack each including a ring and a dielectric membrane secured to and extending across the aperature of the latter ring.

11. An artificial dielectric structure according to claim 7 wherein:
    said membranes and rings have substantially equal coefficients of thermal expansion.

12. An artificial dielectric structure according to claim 7 wherein:
    said membranes and rings have different coefficients of thermal expansion.

13. An artificial dielectric structure according to claim 12 wherein:
    said ring coefficient approximates zero.

14. The method of fabricating a dimensionally stable artificial dielectric unit having obstacle means thereon to be assembled with other similar units to form one artificial dielectric phase changing structure for use in a thermal environment whose temperature fluctuates over a given temperature range comprising the steps of:

selecting a relatively rigid circular ring having a central aperature and a dielectric membrane; and securing said membrane to said ring about the circumference of said ring with the membrane extending across the ring aperature and while said membrane is retained in a condition which creates in the secured membrane at a selected reference temperature within said range an initial tension such that exposure of said unit to said temperature range causes the tension in said membrane to vary between a finite minimum stess value greater than zero at the minimum stress temperature of said range and a maximum stress value less than the maximum permissible stress of the membrane at the maximum stress temperature of said range, whereby said membrane remains taut and said obstacle means remain in fixed position relative to said ring over the entire temperature range.

15. The method according to claim 14 wherein:
said membrane has a coefficient of thermal expansion greater than the coefficient of thermal expansion of said ring; and said membrane and ring are retained at an elevated assembly temperature higher than the highest temperature of said temperature range while said membrane is being secured to said ring, whereby cooling of the membrane and ring to said temperature range prestresses said membrane to said initial tension.

16. The method according to claim 14 wherein:
said ring has a coefficient of thermal expansion greater than the coefficient of thermal expansion of said membrane; and said membrane and ring are retained at an assembly temperature lower than the lowest temperature of said temperature range while said membrane is being secured to said ring, whereby heating of the membrane and ring to said temperature range prestresses said membrane to said initial tension.

17. The method according to claim 14 wherein:
said membrane is stressed to a predetermined tension during securing of the membrane to said ring.

* * * * *